(12) United States Patent
Nadeau

(10) Patent No.: US 7,488,030 B2
(45) Date of Patent: Feb. 10, 2009

(54) TEARDROP TRAVEL TRAILER

(75) Inventor: Daniel Nadeau, Saints-Anges (CA)

(73) Assignee: Par Nado Inc., Saint Frederic (Québec) (CA)

( * ) Notice: Subject to any disclaimer, the term of this patent is extended or adjusted under 35 U.S.C. 154(b) by 12 days.

(21) Appl. No.: 11/681,383

(22) Filed: Mar. 2, 2007

(65) Prior Publication Data

US 2008/0211259 A1 Sep. 4, 2008

(51) Int. Cl.
*B60P 3/35* (2006.01)
(52) U.S. Cl. .................................. 296/172; 296/176
(58) Field of Classification Search ........... 296/171, 296/172, 173, 175, 176, 156, 168, 26.04, 296/26.06
See application file for complete search history.

(56) References Cited

U.S. PATENT DOCUMENTS

| 1,964,894 | A | * | 7/1934 | Rohne ..................... 296/26.02 |
| 2,168,661 | A | | 8/1939 | Anderson et al. |
| 2,567,516 | A | | 9/1951 | Jones |
| 2,920,919 | A | | 1/1960 | Spencer |
| 2,963,313 | A | | 12/1960 | Bennett |
| 3,179,462 | A | * | 4/1965 | Hagen ..................... 296/157 |
| 3,397,908 | A | | 8/1968 | Flajole |
| 3,399,920 | A | | 9/1968 | Knowlton |
| 3,489,452 | A | | 1/1970 | Plante |
| 3,591,230 | A | * | 7/1971 | Cramer ..................... 296/173 |
| 4,579,382 | A | | 4/1986 | Lake |
| 4,982,971 | A | | 1/1991 | Marin |
| 5,058,946 | A | | 10/1991 | Faber |
| 5,681,074 | A | | 10/1997 | Christensen |
| 6,186,580 | B1 | | 2/2001 | Nothem et al. |
| 6,367,866 | B1 | * | 4/2002 | Moore ..................... 296/182.1 |
| 6,840,569 | B1 | | 1/2005 | Leigh |
| 2003/0132644 | A1 | | 7/2003 | Crews |
| 2006/0152040 | A1 | | 7/2006 | Wiebe et al. |
| 2006/0273622 | A1 | | 12/2006 | Laird |

OTHER PUBLICATIONS

Petenwell Industries LLC Camp-Inn Trailers, http://home.centurytel.net/edevold/models.htm.
Little Guy Teardrop Camper/Trailer TravelMate, www.golittleguy.com/specs/TravelMateSpecSheet.pdf.

* cited by examiner

*Primary Examiner*—Dennis H Pedder
*Assistant Examiner*—Melissa A Black
(74) *Attorney, Agent, or Firm*—Ogilvy Renault, LLP; Alexandre Daoust

(57) ABSTRACT

The teardrop travel trailer has an airfoil shape with a leading edge region at the front, a trailing edge region at the rear, two relatively flat opposite sides, and a superior surface extending from the leading edge region to the trailing edge region, the superior surface being deployable into a roof by pivoting around a transversal axis located along the leading edge region.

15 Claims, 10 Drawing Sheets

TEARDROP TRAVEL TRAILER

BACKGROUND

Travel trailers, called caravans in Europe, are small trailers in which people can live and travel simultaneously. Travel trailers are designed to be towed by a vehicle and as such they typically create a relatively large amount of drag, especially when traveling on the highway. With the increasing price of gas and awareness to energy consumption, the drag created by existing travel trailers poses a practical limitation to their enjoyability. In fact, not only does high drag equate to high energy consumption, but it also implies a higher power requirement upon the towing vehicle. Hence, even smaller travel trailers typically require at least a large car or a small truck to tow.

Although known travel trailers were found satisfactory to a certain degree, there remains room for improvement, including improving the aerodynamics of such travel trailers to reduce drag.

SUMMARY

In accordance with one aspect, there is provided a travel trailer which generally has an airfoil, or teardrop, aerodynamic shape. A travel trailer having an airfoil shape can advantageously present a lower amount of drag in comparison with travel trailers of relatively the same size which do not have an airfoil shape.

In accordance with one aspect, there is provided a travel trailer convertible between an aerodynamic travel configuration and a habitat configuration, comprising a wheeled body having a towing hitch at a front thereof, the body having an airfoil shape when in the travel configuration, with a leading edge at the front and a trailing edge at the rear, two relatively flat opposite side walls including one having a door, and a roof extending from the leading edge to the trailing edge, hinged along the leading edge to be deployable from the travel configuration into the habitat configuration.

In accordance with another aspect, there is provided a teardrop travel trailer comprising a body having an airfoil shape with a leading edge region at the front, a trailing edge region at the rear, two relatively flat opposite sides, and a superior surface extending from the leading edge region to the trailing edge region, the superior surface being deployable into a roof by pivoting around an axis located along the leading edge region.

In accordance with another aspect, there is provided a travel wailer comprising a body portion having a front end and a rear end, a wheeled base having a towing hitch at the front, two opposite side walls having an airfoil profile and extending upwardly from the base, the side walls each having an upper supporting surface, and a front wall portion joining both side walls up to an intermediate height thereof, and a roof pivotally mounted to the front wall portion around a transversal pivot axis and shaped as an upper surface of the airfoil profile to mate with the supporting surfaces of the side walls, the roof being pivotable between a collapsed position where it is supported by the side walls, and raised position where it adopts a relatively horizontal attitude in which a substantial portion thereof is spaced apart from the base by more than the height of a man.

In accordance with another aspect, there is provided a travel trailer convertible between an aerodynamic travel configuration and a habitat configuration, comprising a wheeled body having a towing hitch at a front thereof, the body having an airfoil shape when in the travel configuration, with a leading edge at the front and a trailing edge at the rear, two relatively flat opposite side walls including one having a door, a roof extending from the leading edge to the trailing edge, hinged along the leading edge to be deployable from the travel configuration into the habitat configuration, the roof having two opposite wall portions extending downwardly therefrom, each slidable against a corresponding side wall to provide an extension thereto when the roof is deployed, and a rear wall unit pivotally mounted along a fixed rear portion of the body to be deployable between the fixed rear portion and a rear portion of the roof when the roof is deployed.

In accordance with another aspect, there is provided a travel trailer convertible between a travel configuration and a habitat configuration, comprising a wheeled body having a towing hitch at a front thereof, the body having an airfoil shape when in the travel configuration, with a leading edge at the front and a trailing edge at a rear end, two relatively flat opposite side walls including one having a door, and a roof extending from the leading edge to the trailing edge, hinged along the leading edge to be deployable from the travel configuration into the habitat configuration; wherein a hinge having a vertically displaceable pivot axis connects the roof to a fixed portion of the body at the leading edge, and an aluminum sheet extends from the fixed portion to the roof, covering at least a portion of the fixed portion, the hinge, and at least a portion of the roof.

DESCRIPTION OF THE FIGURES

Further features and advantages will become apparent from the following detailed description, taken in combination with the appended figures, in which.

DETAILED DESCRIPTION

Figure 1:
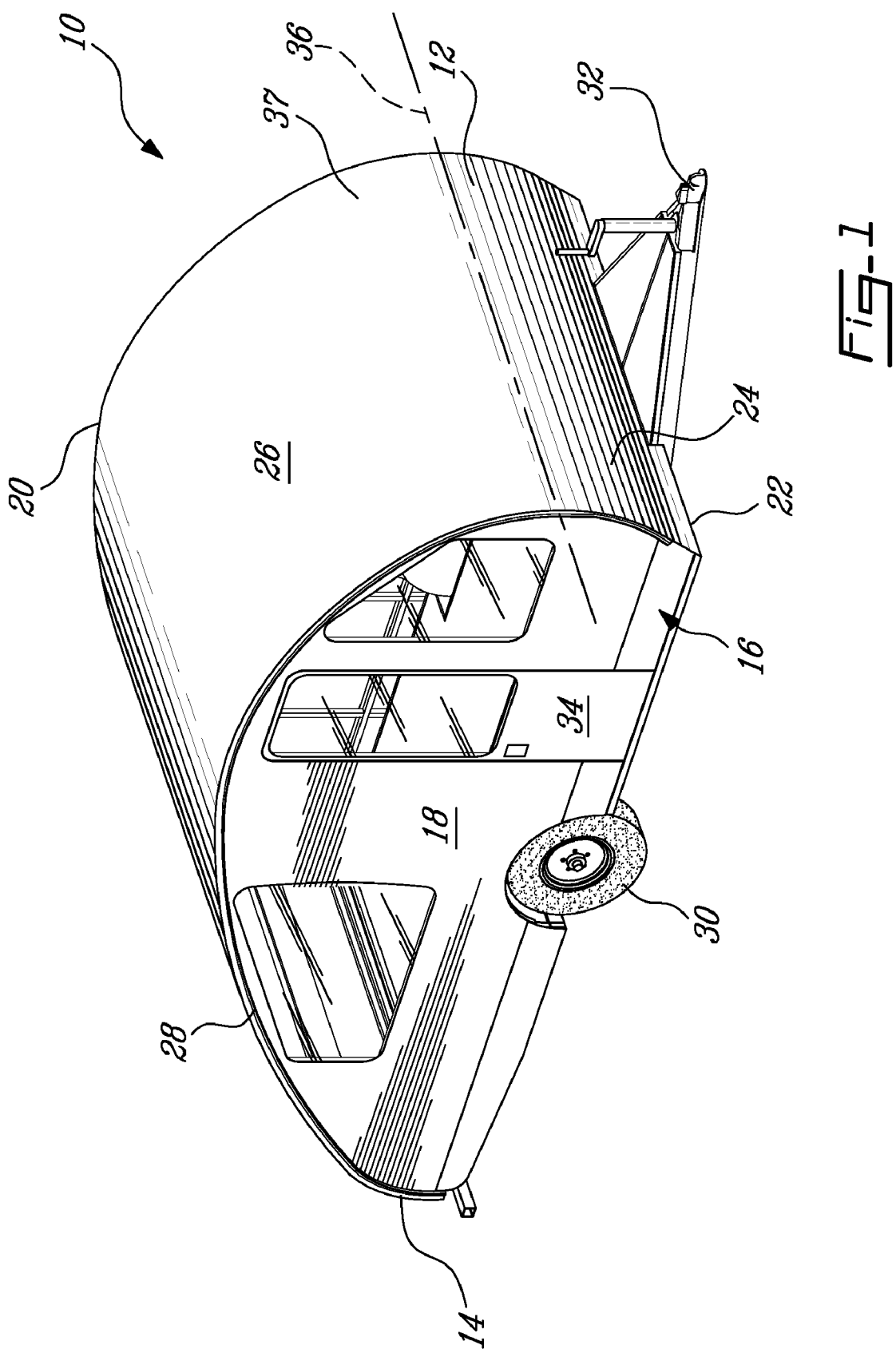
FIG. 1 is an isometric view of an example of an improved travel trailer in a travel configuration.

FIG. 1 shows an example of an improved travel trailer 10 in a travel configuration. In this configuration, the travel trailer 10 generally has an airfoil shape with a leading edge 12 at the front and a trailing edge 14 at the rear. The travel trailer 10 has a body 16 with two side walls 18, 20 extending upwardly from a base 22, and a front wall portion 24 joining the two side walls 18, 20 up to an intermediate height thereof at the front. In this case, the intermediate height is about ⅓ of the total height of the side walls 18, 20. The side walls 18, 20 have an airfoil profile. The travel trailer 10 also has a roof 26 extending from the leading edge 12 to the trailing edge 14, and which is pivotally connected to the front wall portion 24 to pivot between a collapsed position and a raised position. The roof 26 is in a collapsed position when in the travel configuration, and is supported by upper ends 28, or upper supporting surfaces, of the side walls 18, 20. The roof 26 is also referred to as the superior surface of the airfoil profile of the side walls 18, 20. The base 22 of the travel trailer 10 is mounted on wheels 30, and has a towing hitch 32 at the front. In this case, the right side wall 18 has a door 34 allowing entry into the travel trailer. The roof 26 of the travel trailer 10 is pivotally mounted to an upper end of the front wall portion 24 along a transversal pivot axis 36 which extends generally along the leading edge 12 at the front. A flexible and impervious sheet material 37 covers the front portion of the travel trailer 10, extending over the front wall portion 24 and at least a front portion of the roof 26. The roof can be pivoted into a raised position, which is shown in FIGS. 2 and 3.

Figure 2:
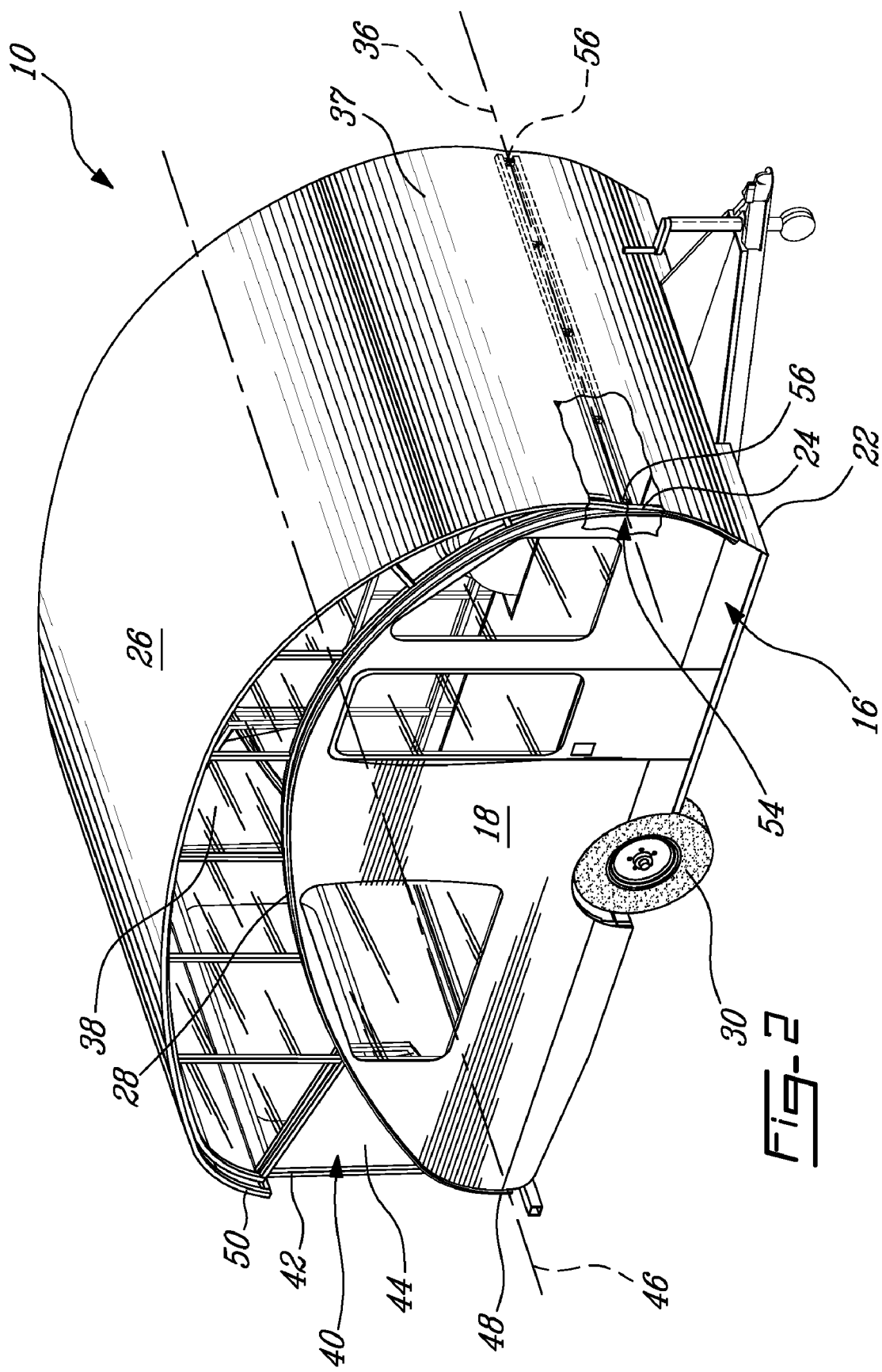
FIG. 2 is an isometric view showing the travel trailer of FIG. 1 in a habitat configuration.
Figure 3:
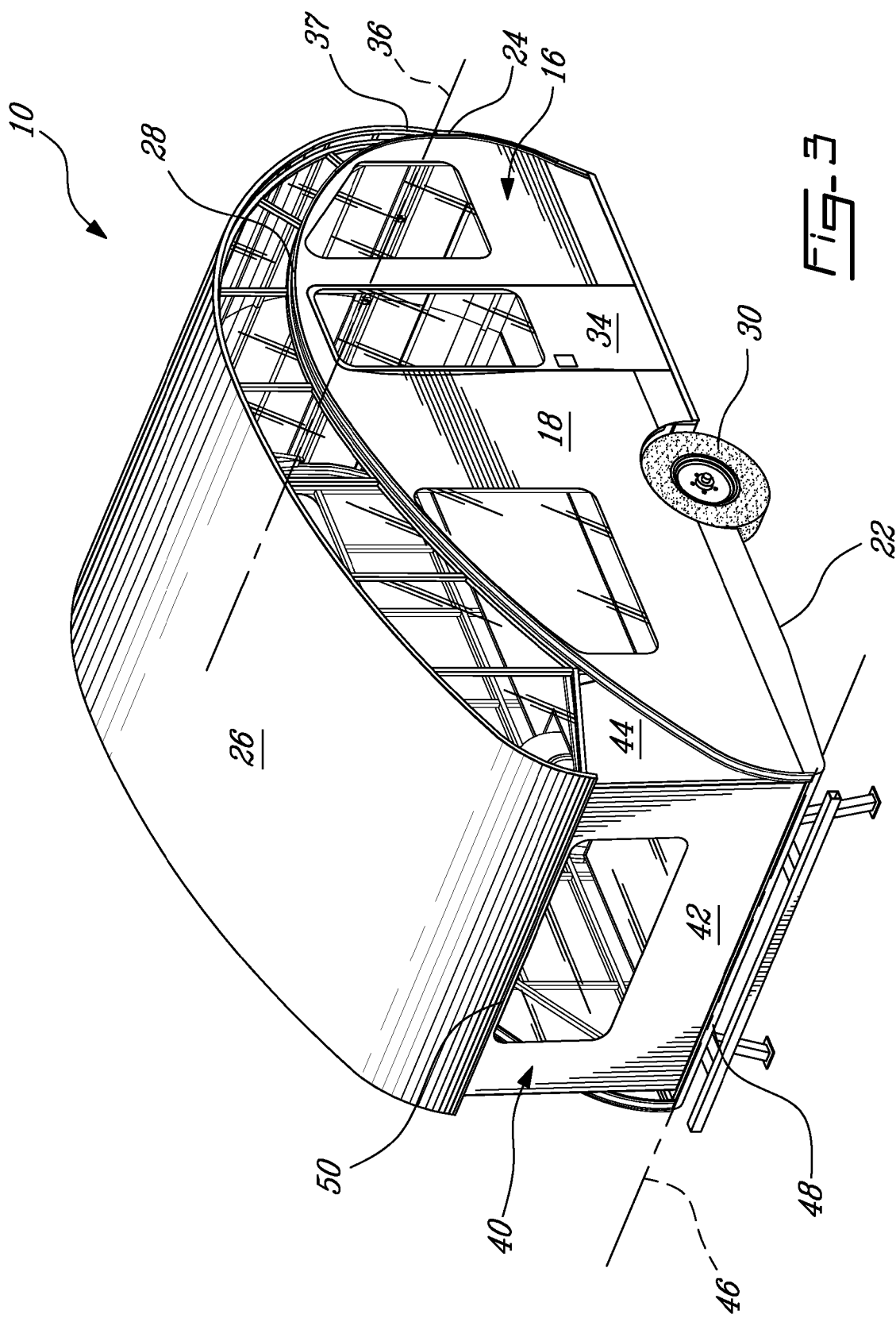
FIG. 3 is a view similar to FIG. 2 showing the travel trailer from an opposite end thereof.

The right side of the travel trailer 10 is shown in FIGS. 1 to 3. Except for the door 34, which is provided only on one side in this embodiment, the travel trailer is generally symmetrical and similar components are present when viewed from the opposite side.

FIGS. 2 and 3 shows the travel trailer 10 in a habitat configuration. The roof 26, hingeably mounted, is shown in the raised position. In the raised position, the roof 26 has a relatively horizontal attitude, when compared to the collapsed position (FIG. 1), and it is spaced apart from the base 22 at least by the height of a man on a major portion thereof. The roof has two opposite wall portions 38 each extending downwardly from an opposite side thereof. Each wall portion 38 is slideable against a corresponding side wall 18 so as to provide an extension thereto when the roof 26 is in the raised position. In this example, the wall portions 38 which extend downwardly from the roof 26 are translucid to allow more daylight into the travel trailer 10.

Figure 4:
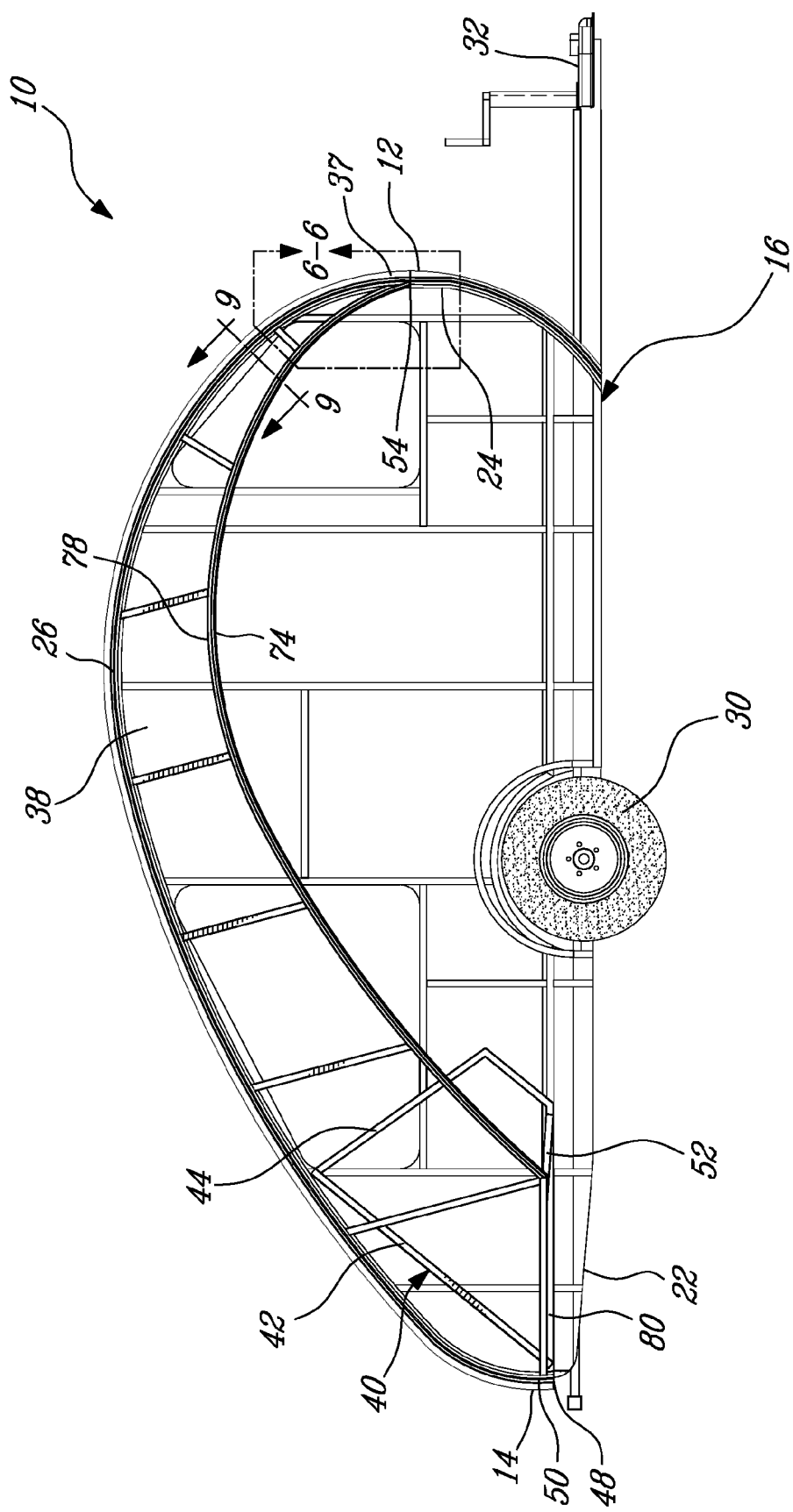
FIG. 4 is a cross-sectional view of the travel trailer of FIG. 1 in the travel configuration.
Figure 5:
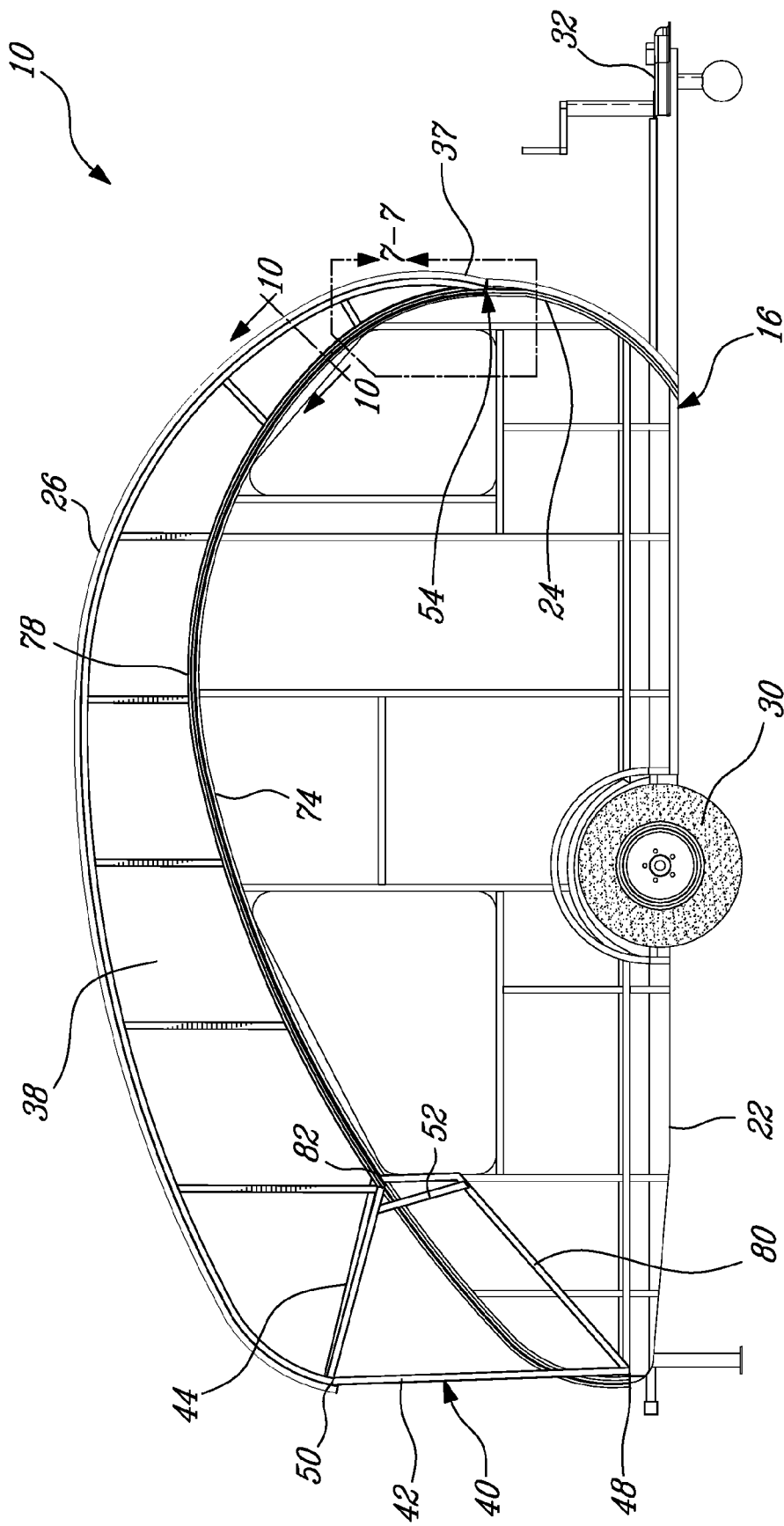
FIG. 5 is a view similar to FIG. 4 showing the travel trailer in the habitat configuration.

A rear wall unit 40 is also provided. The rear wall unit 40 has a rear wall portion 42 and two opposite wall portions 44 extending perpendicularly from opposite sides thereof. The rear wall unit 40 is pivotally mounted along a transversal pivot axis 46 located proximate a rear end 48 of the base 22, and is pivotable between a collapsed position where it is nested between the side walls (as shown in FIGS. 1 and 4), and a deployed position where it closes off the rear end of the trailer 10 (as shown in FIGS. 2, 3 and 5), between the rear end 48 of the base 22 and the rear end 50 of the roof 26. When in the deployed position, the rear wall portion 42 adopts a vertical attitude. Each one of the two opposite wall portions 44 of the rear wall unit 40 is slideable against a corresponding side wall 18 of the travel trailer 10 to provide an extension to the corresponding side wall 18 when in the deployed position.

FIGS. 4 and 5 depict the pivoting of the roof from the collapsed position (FIG. 4) to the raised position (FIG. 5) in greater detail. In the illustrated embodiment, the rear wall unit 40 is connected to the roof 26 by a connecting member 52 so as to be automatically deployed when the roof 26 is deployed. The connecting member 52 can be a strap, or an equivalent thereof, for example. In use, the connecting member 52 pulls the rear wall unit 40 upwardly to pivot around its pivot axis as the roof 26 is raised, thus eventually positioning the rear wall portion 40 in a substantially vertical position between the rear portion 50 of the roof 26 and the rear portion 48 of the base 22. The center of gravity of the rear wall unit 40 is offset toward the front of the travel trailer relatively to the pivot axis 46 of the rear wall unit 40, due to the presence of the wall portions 44. This is advantageous because it allows the rear wall unit 40 to automatically collapse between the side walls 18, 20 when the roof 26 is lowered into the collapsed position.

Figure 6:
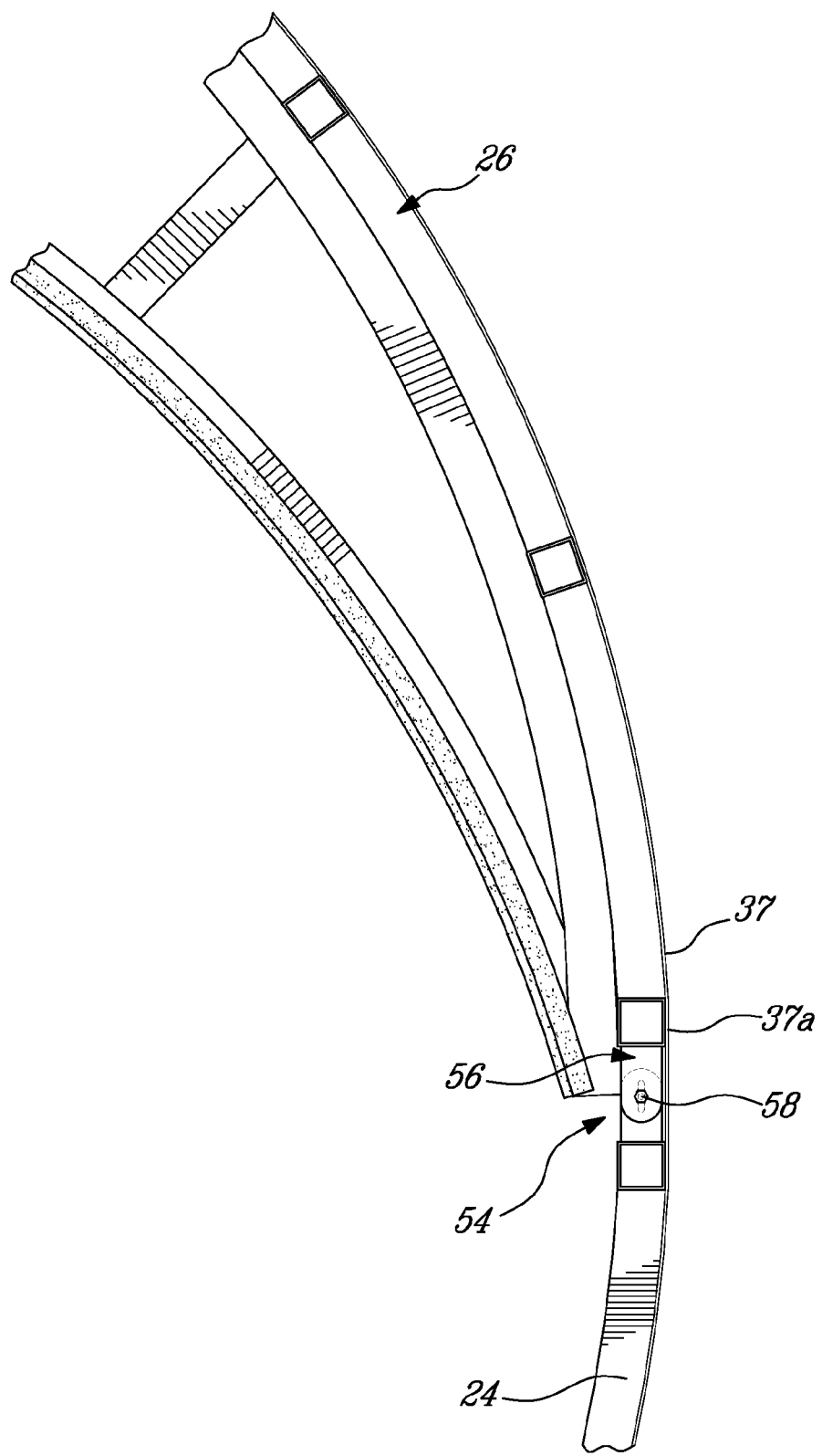
FIG. 6 is an enlarged view taken along line 6-6 of FIG. 4.
Figure 7:
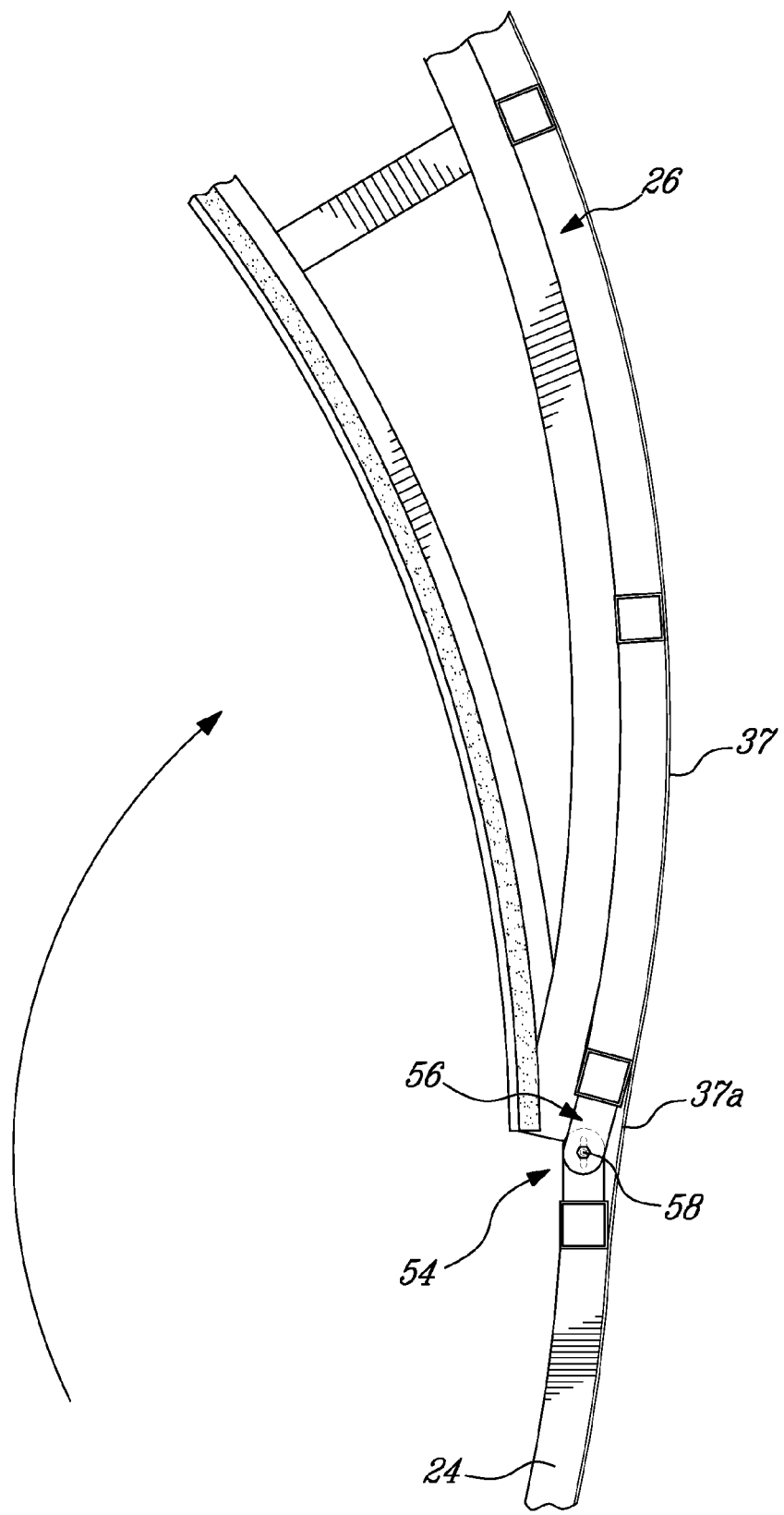
FIG. 7 is an enlarged view taken along line 7-7 of FIG. 5.

Referring now to FIGS. 6 and 7, a hinge 54 connects the roof 26 to the front wall portion 24, which is fixed relatively to the base 22. In this example, the hinge 54 is covered by the flexible sheet material 37, and includes two hinge elements 56 at opposite sides. The flexible sheet material 37 can be an aluminium sheet 37a. When raising the roof 26, the total angular displacement thereof can be sufficiently low to allow the aluminum sheet 37a to resiliently (or elastically) absorb the displacement. The hinge 54 has a vertically displaceable pivot axis such that it can follow the pivotment of the roof 26. Hence, the weight of the roof 26 is partially supported by the aluminum sheet 37a whereas front to rear displacement, or shear displacement, is prevented by the hinge 54.

Figure 8:
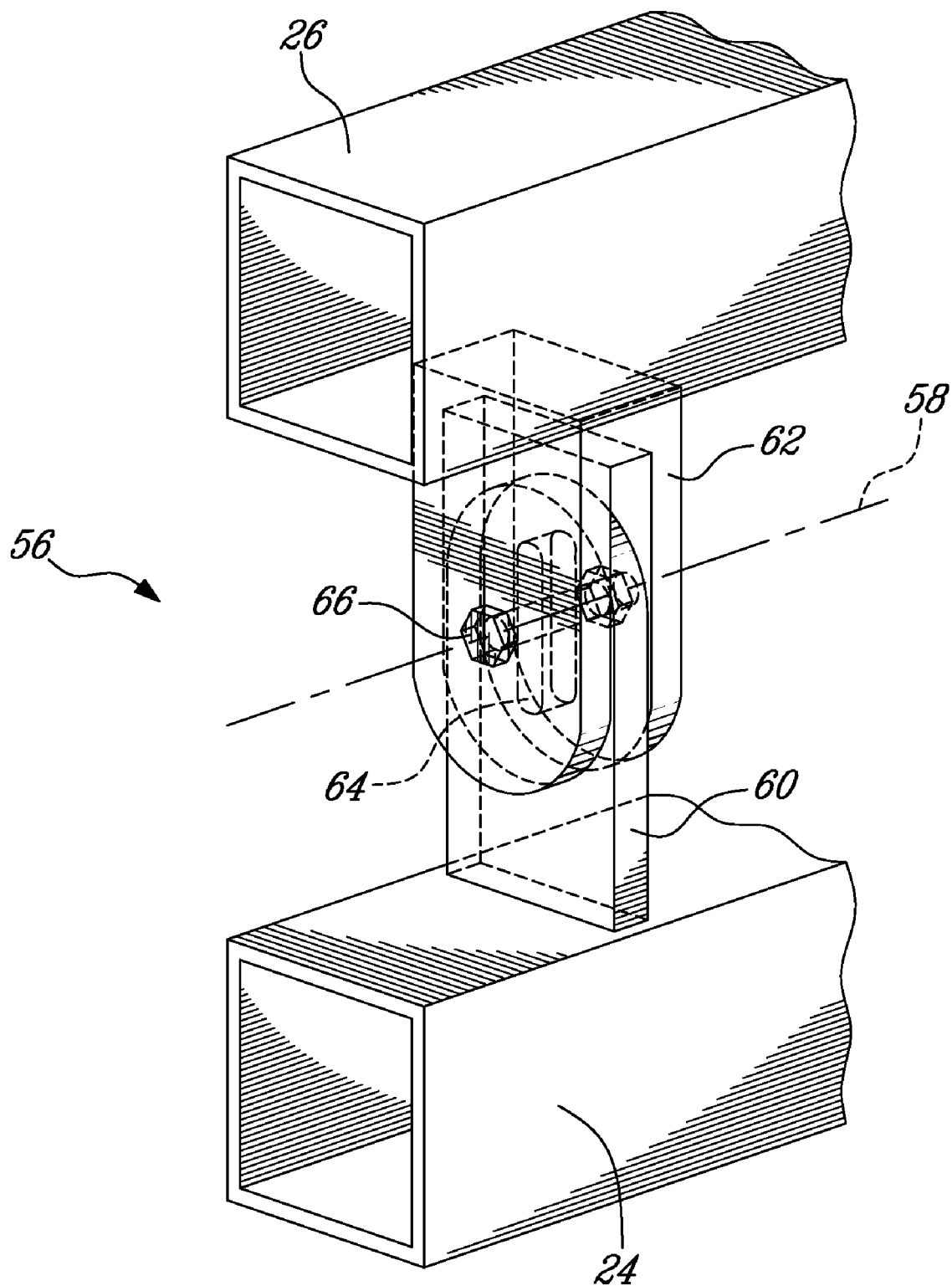
FIG. 8 is an enlarged view showing a hinge element of the travel trailer of FIG. 1.

The hinge 54 can include a plurality of hinge elements 56. An example of a hinge element 56 is depicted in FIG. 8. In this example, the hinge element 56 has a fixed member 60 attached to the front wall portion 24, and a mobile member 62 attached to a component of the roof 26. The fixed member 60 has a vertically extending slot 64 through which a shaft 66 of the mobile member 62 extends. Therefore, the roof 26 can pivot around the axis 58 of the shaft 66, and the shaft 66 is free to be vertically displaced along the vertically extending slot 64. Hence, the true pivot axis of the roof is not the shaft 66, but is actually positioned along the aluminum sheet 37a. In this example, the mobile member 62 has two opposite sides and the fixed member 60 penetrates therebetween for enhanced stability.

Figure 9:
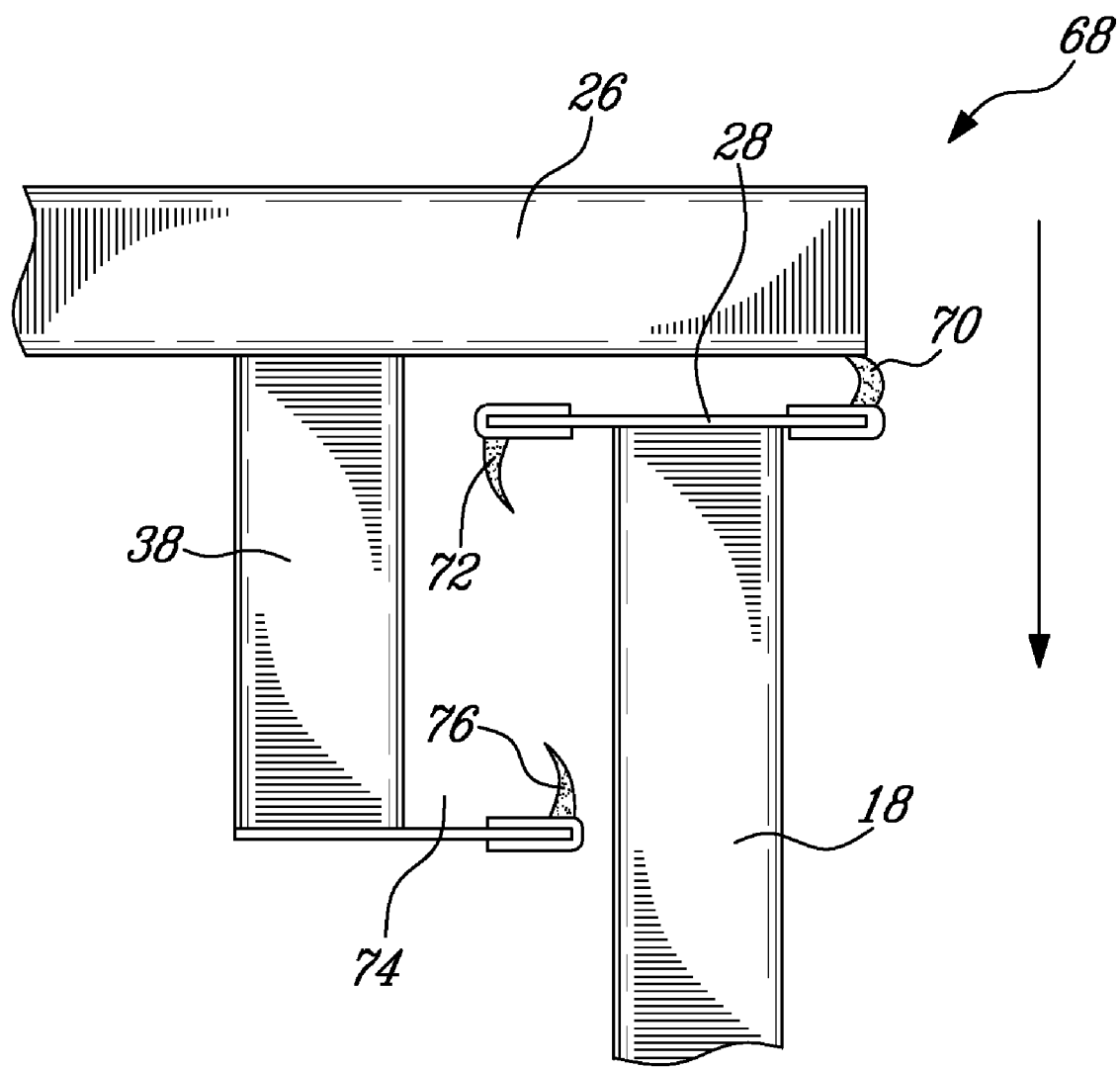
FIG. 9 is a cross-sectional view taken along line 9-9 of FIG. 4.
Figure 10:
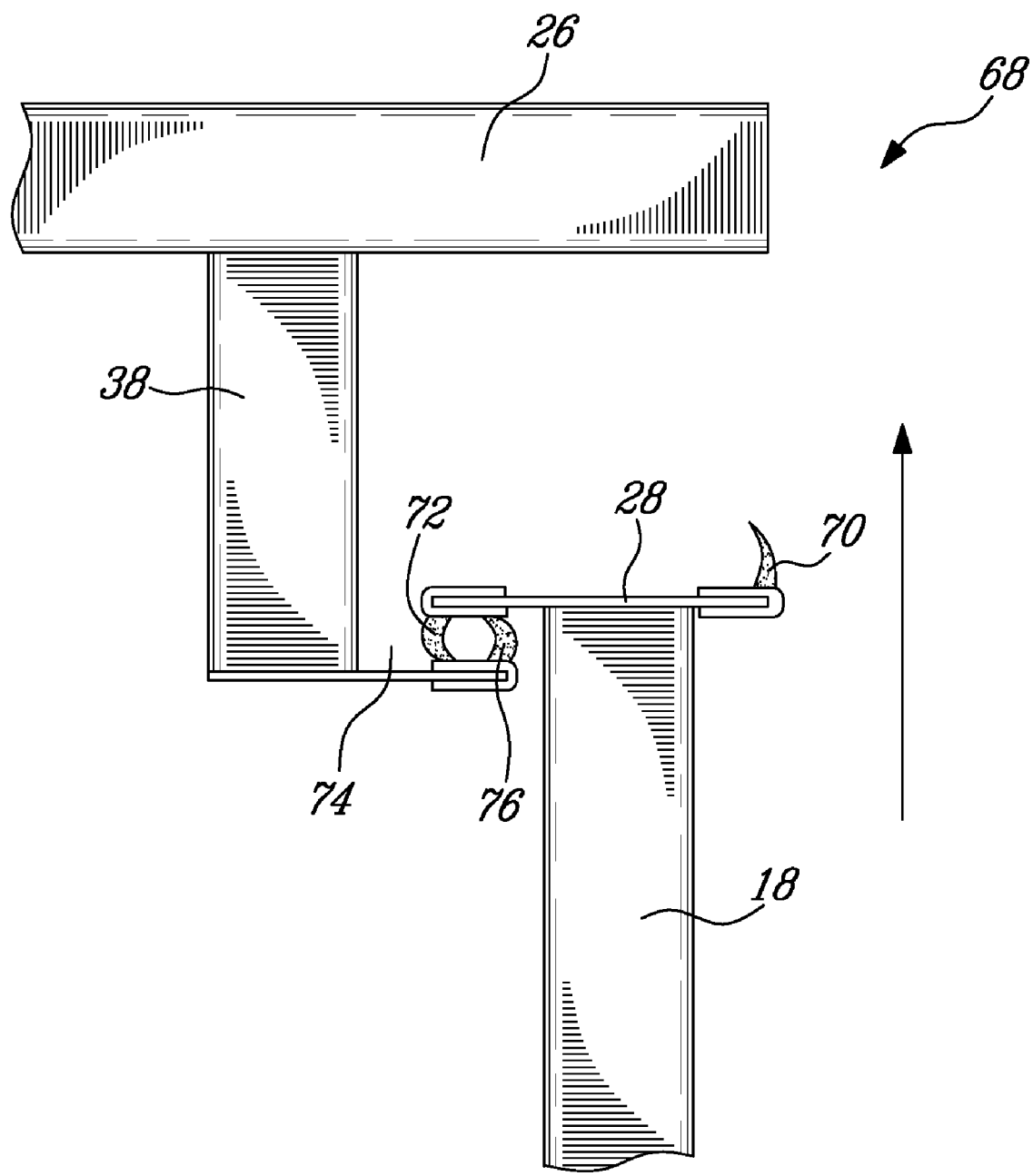
FIG. 10 is a cross-sectional view taken along line 10-10 of FIG. 5.

The wall portions 38 are slideable along the inside surface of the side walls 18 (FIG. 3). To prevent water from penetrating between the wall portions 38 and the side walls 18, and entering the travel trailer 10, a gutter system 68 is used. The gutter system 68 is depicted in greater detail in FIGS. 9 and 10, showing the roof 26 in the collapsed position, and in the raised configuration, respectively. The side wall 18 has a side wall external seal 70 as part of the upper supporting portion 28 of the side wall 18. The side wall external seal 70 extends upwardly from the side wall 18 toward the roof 26. The side wall 18 also has and a side wall internal seal 72 which extends downwardly. The wall portion 38 has a gutter 74 extending from the bottom thereof toward the side wall 18, and a gutter seal 76 oriented upwardly toward the side wall internal seal 72. The side wall internal seal 72 can be positioned for engagement between the gutter seal 76 and the side wall portion 38 when the roof 26 is pivoted into the raised position.

When the roof 26 is in the collapsed position, shown in FIG. 9, the side wall external seal 70 abuts against the roof 26 and prevents entry of water therein. When the roof 26 is in the raised position, shown in FIG. 10, the side wall internal seal 72 engages the gutter 74 and the gutter seal 76 cooperates therewith in preventing water in the gutter 74 from escaping between the gutter 74 and the side wall 18, where it could penetrate into the travel trailer.

Referring now to the gutter 74 when viewed from the side, rather than in the cross-sections discussed above, the gutter 74 longitudinally follows the bottom end of the side wall portions 38, which also corresponds to the longitudinal shape of the upper portion 28 of the side walls 18. The gutter 74 thus has a longitudinally arctuate shape with an apex 78, shown in FIGS. 4 and 5, and sloping downwardly forwardly of, and rearwardly of the apex 78. Water entering the gutter forward of the apex 78 can be channeled toward the leading edge 12, at the front, where it can be evacuated externally to the sides, whereas water falling into the gutter 74 rearwardly from the apex 78 can be channeled toward the rear of the travel trailer 10.

In the example, the rear wall unit 40 also has a gutter portion (not illustrated), extending along a lower portion 80 of the side wall portion 44 thereof, between the side wall portion 44 and the side wall 18 of the travel trailer 10. Water channeled in the gutter 74 towards the rear exits the rear end 82

(FIG. 5) of the gutter 74 and falls into the gutter portion (not shown) of the rear wall unit 40, where it is further channeled toward the rear and evacuated to the ground.

The example described above and illustrated is given for illustrative purposes only, as an indication of a way to embody the present improvements. Alternate configurations can substantially depart from this example.

For example, the depicted hinge can be substituted by an external hinge linking the roof to the front wall portion and sealed from the inside with a gutter arrangement to evacuate water penetrating therein to the sides of the travel trailer. However, the hinge system described and illustrated can advantageously be used since it provides a totally impervious seal to water at the leading end of the travel trailer which is particularly useful when traveling in rain conditions.

The particular airfoil shape of the body can depart from the one of the illustrated embodiment. It will be noted however that airfoil shapes offering relatively low aerodynamic lift characteristics are preferred.

To render the travel trailer available for towing by relatively smaller cars, the materials used in the travel trailer are preferably lightweight. Aluminum sheets are thus used in the illustrated example to offer a lower weight than if sheets of heavier metals were used. Smooth external surfaces are also encouraged, including at the bottom side of the travel trailer, to reduce the overall drag.

In alternate configurations, the upper wall portions which extend downwardly from the roof can be provided outside the side walls rather than being provided inside the side walls. Positioning them inside can allow to maintain a smoother external surface to the side walls in the travel configuration. Alternately, if the upper wall portions are used outside the side walls, the need for internal gutters is greatly diminished.

In the illustrated example, the rear wall unit has an aluminum facade. In alternate embodiments, it can be provided with a frame covered by a fabric, such as a canvas, for example.

The roof can be pivoted by electric actuators positioned between the base and the roof. Using electric actuators can advantageously allow a user to interrupt the deployment at any moment thereof if he visualizes an anomaly by visual inspection. In alternate embodiments, the roof can be manually raised and can be maintained in the raised position by pneumatic cylinders similarly to how trunks of some hatchback cars are maintained in a raised position.

In the illustrated example, the upper wall portions which extend downwardly from opposite sides of the roof, and the rear wall unit are provided as rigid components. Alternate side closures to the upper wall portions such as a deployable fabric or canvas can be used instead of the rigid upper wall portions, and an alternate rear closure such as a deployable fabric or canvas, can be used instead of the framed rear wall unit depicted.

As can be seen therefore, the examples described above and illustrated are intended to be exemplary only. The scope of the invention(s) is intended to be determined solely by the appended claims.

What is claimed is:

1. A travel trailer convertible between a travel configuration and a habitat configuration, comprising a wheeled body having a towing hitch extending at a front end thereof, the body having an airfoil shape when in the travel configuration, having a longitudinally curved roof with an apex offset towards the front end, a rear end tapering to a trailing edge, the front end being curved around a transversal axis and having a leading edge at an intermediate height of the body, and two transversally opposite side walls each having a corresponding upper edge mating with the roof when in the travel configuration, the roof extending from the leading edge to the trailing edge, hinged along the leading edge and thereby deployable from the travel configuration into the habitat configuration, wherein the roof provides a standing-height space inside the body substantially along the entire length of the travel trailer when deployed in the habitat configuration.

2. The travel trailer of claim 1 wherein a hinge having a vertically displaceable pivot axis connects the roof to a fixed portion of the body at the leading edge, and an aluminum sheet extends from the fixed portion to the roof, covering at least a portion of the fixed portion, the hinge, and at least a portion of the roof.

3. The travel trailer of claim 1 further comprising two opposite wall portions extending downwardly from the roof, each slidable against a corresponding side wall to provide an extension thereto when the roof is deployed.

4. The travel trailer of claim 3 wherein the wall portions are nested between the side walls when in the habitat configuration.

5. The travel trailer of claim 1 further comprising a rear wall unit pivotally mounted along a fixed rear portion of the body to be deployable between the fixed rear portion and a rear portion of the roof when the roof is deployed.

6. The travel trailer of claim 5 wherein the rear wall unit has a rigid and planar rear wall portion and two rigid and planar transversally-opposite wall portions fixedly and permanently connected to and extending perpendicularly from corresponding opposite sides of the planar rear wall, each wall portion being slidable against a corresponding side wall to provide an extension thereto when the roof is deployed.

7. The travel trailer of claim 5 wherein the rear wall unit is connected to the roof to be automatically pivotally deployed when the roof is deployed.

8. The travel trailer of claim 5 wherein the rear wall unit has a center of gravity horizontally offset from the pivot when in the habitat configuration, to automatically pivotally collapse between the side walls when the roof is pivoted into the travel configuration.

9. The travel trailer of claim 1 wherein the two side walls are permanent and rigid, and one of the two side walls has a door positioned below the corresponding upper edge, below or near the apex.

10. The travel trailer of claim 1 wherein the intermediate height is equal to about ⅓ of the total height of the side walls.

11. A travel trailer convertible between a travel configuration and a habitat configuration, comprising a wheeled body having a towing hitch at a front thereof, the body having an airfoil shape when in the travel configuration, with a leading edge at the front and a trailing edge at a rear end, two relatively flat opposite side walls including one having a door, and a roof extending from the leading edge to the trailing edge, hinged along the leading edge to be deployable from the travel configuration into the habitat configuration; wherein a hinge having a vertically displaceable pivot axis connects the roof to a fixed portion of the body at the leading edge, and an aluminum sheet extends from the fixed portion to the roof, covering at least a portion of the fixed portion, the hinge, and at least a portion of the roof.

12. A travel trailer comprising two transversally spaced-apart side walls having a same longitudinally-extending airfoil profile with a front end curved around a transversal axis, a tapering rear end, and an apex offset toward the front end, both side walls extending upwardly from a wheeled base having a front towing hitch, the side walls each having an upper supporting surface, a front wall portion extending transversally between and joining a lower portion of the two side walls up to an intermediate height thereof, the front wall portion having a transversally-extending upper edge, and a roof having a front edge pivotally mounted to the upper edge of the front wall portion around a transversal pivot axis, the roof extending above and between the side walls and longitudinally curved to mate with the supporting surfaces of the side walls, the roof being pivotable around the transversal pivot axis between a collapsed position where it is supported by the side walls, and a raised position where it adopts a relatively horizontal attitude in which it provides a standing-height space inside the body, above the base, substantially along the entire length of the travel trailer.

13. The travel trailer of claim 12 wherein the roof has two opposite wall portions extending downwardly therefrom, each slidable against a corresponding side wall to provide an extension thereto when the roof is in the raised position.

14. The travel trailer of claim 12 further comprising a rear wall unit pivotally mounted to the base, at the rear end, along a transversal pivot axis, the rear wall unit being pivotable between a collapsed position where it is nested between the side walls and a deployed position to close off the rear side of the trailer when the roof is in the raised position.

15. The travel trailer of claim 14 wherein the rear wall unit has a rear wall portion extending verticaily, and two opposite wall portions extending perpendicularly from opposite sides of the rear wall portion, toward the front, when the rear wall unit is in the deployed position.

* * * * *